United States Patent Office 3,574,158
Patented Apr. 6, 1971

3,574,158
DYEABLE ACRYLONITRILE POLYMER COMPOSITIONS
Denis Coleman, Stamford, Conn., assignor to American Cyanamid Company, Stamford, Conn.
No Drawing. Continuation-in-part of application Ser. No. 692,677, Dec. 22, 1967. This application Apr. 10, 1968, Ser. No. 720,329
Int. Cl. C08f 15/00, 45/24, 37/18
U.S. Cl. 260—29.6          17 Claims

ABSTRACT OF THE DISCLOSURE

A copolymer of about 65 to 92 mole percent acrylonitrile and about 8 to 35 mole percent of a salt of the formula:

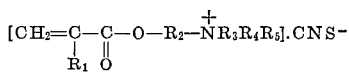

wherein $R_1$ is selected from the group consisting of hydrogen and methyl, $R_2$ is selected from the group consisting of alkylene and hydroxyalkylene of two to four carbon atoms and —$CH_2CH_2OCH_2CH_2$—, and $R_3$, $R_4$ and $R_5$ are each lower alkyl of between 1 and 3 carbon atoms. The copolymer is obtained by copolymerizing in an aqueous medium acrylonitrile and a quaternary ammonium salt of the formula:

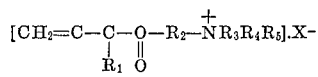

wherein $R_1$, $R_2$, $R_3$, $R_4$ and $R_5$ are defined above and X is a water soluble anion. The copolymer is precipitated from the aqueous medium with a water-soluble thiocyanate compound. These copolymers are useful in the production of acid dyeable or modified basic dyeable acrylonitrile shaped articles when blended with acrylonitrile polymers containing more than 70 weight percent acrylonitrile.

---

This application is a continuation-in-part of application No. 692,677, filed Dec. 22, 1967, now abandoned.

This invention relates to novel copolymers of acrylonitrile, their methods of preparation, and their use in shaped articles such as fibers. More particularly, the present invention relates to copolymers comprising acrylonitrile and a quaternary ammonium compound, a process for their preparation from aqueous solutions thereof, and their use in producing dyeable and cross-dyeable shaped articles.

The term "polymer of acrylonitrile" as used herein refers to polymers which contain at least 70 percent polymerized acrylonitrile. The polymer of acrylonitrile can be homopolymeric or it can be a copolymer with at least one other ethylenically unsaturated comonomer. Illustrative of the numerous ethylenically unsaturated comonomers polymerizable with acrylonitrile are those mentioned in Coleman, U.S. Pat. 3,222,112 and Cummings, U.S. Pat. 2,948,581 and the various other patents referred to in each of these patents. The term "functionally modified polymer" as used herein refers to blends of (a) polymers of acrylonitrile with (b) copolymers of acrylonitrile and polymerizable quaternary ammonium monomers produced in accordance with the present invention. The term "functional copolymer" as used herein refers to the copolymers provided by the present invention containing quaternary ammonium moieties and employed to produce the "functionally modified polymer."

It is known that polymers of acrylonitrile can be dissolved in suitable solvents and subsequently formed into shaped articles such as fibers from such solutions. Generally, polymers of acrylonitrile must be blended with additives or chemically modified prior to their use in many applications.

At the present time, physical properties of polymers of acrylonitrile including dyeability, fire retardancy, antistatic properties and the like are regulated by incorporation therein, through blending or chemical reaction, of materials (e.g., additives, comonomers, or functional polymers or copolymers) which supply the desired physical and chemical characteristics. For example, polymers of acrylonitrile with improved dyeability can be obtained by the introduction of acid groups through the use of selected acidic comonomers or the selection of appropriate catalyst systems, or by the introduction of basic groups by copolymerization of acrylonitrile with nitrogen containing heterocyclic comonomers.

It is also known that polymers of acrylonitrile having quaternary ammonium moieties have improved dyeability. Two general processes for incorporating the quaternary ammonium moiety into a polymer of acrylonitrile are known.

In one process, the acrylonitrile monomer is copolymerized directly with the quaternary ammonium monomer in relatively small amounts sufficient to impart the desired improved dyeability characteristics to the resultant polymeric material. The resultant polymeric material can then be employed to produce shaped articles.

In a second procedure employing a blending technique, acrylonitrile monomer is copolymerized with a quaternary ammonium compound in an aqueous medium. The concentration of quaternary ammonium compound is maintained at a high level, but not so high as to render the resultant copolymer soluble in the aqueous polymerizing medium, or to form water-polymer emulsions. To obtain the desired insolubility, the concentration of quaternary ammonium compound is maintained below 8 mole percent and preferably below about 5 mole percent. By maintaining the copolymer in an insoluble form, it can be separated readily from the aqueous polymerizing medium by filtration. Subsequently, the acrylonitrile-quaternary ammonium compound copolymer is blended with a polymer of acrylonitrile containing above about 70 weight percent acrylonitrile in a solvent medium capable of dissolving both the copolymer and the polymer therein. Thereafter shaped articles are produced by processing the resultant solution.

The blending procedure is generally preferred over the procedures which copolymerize acrylonitrile monomer and quaternary ammonium monomers to produce a dyeable copolymer. It is more economical from a commercial standpoint since only minor quantities of the functional copolymer containing a high proportion of functional moieties need be prepared for subsequent blending. The functional copolymers are easily dissolved in the common solvents for polymers of acrylonitrile so that easy blending is obtained and shaped articles can be produced directly from these solutions. Furthermore, additional functional copolymers and other additives can be added simultaneously to the dissolved polymer of acrylonitrile without employing additional mixing steps for each added material.

However, with the presently available polymerization and recovery techniques, the concentration of quaternary ammonium monomer employed to produce the functional copolymer must be kept at a low level to avoid producing a water-soluble copolymer that is hard to recover from the aqueous polymerization mixture. Since the concentration of quaternary ammonium groups in the copolymer is limited to a low level, high proportions of functional copolymer must be prepared and blended with the polymer of acrylonitrile in order to introduce even the relatively small weight percent of quaternary ammonium moiety desired for imparting desired dyeability characteristics. This need nullifies some of the advantages gained by employing the blending technique.

It is an object of the present invention to provide functional copolymers of acrylonitrile containing high concentrations of aliphatic quaternary ammonium moieties.

It is a further object of the present invention to provide a process for recovering, from aqueous polymerization solutions, functional copolymers of acrylonitrile containing high concentrations of aliphatic quaternary ammonium moieties chemically bound into the copolymer structure.

It is a further object of the present invention to provide functional copolymers of acrylonitrile and high concentrations of copolymerizable quaternary ammonium monomers, which copolymers are soluble in solvents normally employed for polymers of acrylonitrile.

It is a still further object of the present invention to provide shaped articles comprising a blend of a polymer of acrylonitrile and a minor amount of a functional copolymer of acrylonitrile containing quaternary ammonium moieties.

It is yet a further object of the present invention to provide yarns and fabrics of (a) fibers of differing abilities to absorb basic dyes from a single dyebath with or without (b) fibers dyeable by acid dyes wherein each of fibers (a) and (b) are not stained by dyes used for dyeing the other of said fibers.

It is yet a still further object of the present invention to provide such yarns and fabrics wherein all of said comprise primarily the same polymer of acrylonitrile.

The present invention provides functional copolymers of acrylonitrile and quaternary ammonium compounds which can be prepared in an aqueous polymerizing medium and which are readily recoverable therefrom. Furthermore, it provides functional copolymers of acrylonitrile, containing high concentrations of quaternary ammonium moieties, which are readily blended by "masterbatching" with polymers of acrylonitrile to give polymer blends which are useful in producing shaped articles of improved dyeability. It also provides yarns and fabrics of fibers having different dye characteristics whereby, from a single dyebath, a single yarn or fabric having different shades and/or different colors can be produced.

The present invention is based upon the discovery that water-soluble copolymers of 92–65 mole percent of acrylonitrile and 8–35 mole percent of quaternary ammonium monomer can be readily separated from aqueous solutions by a novel treatment of such solutions with specific coagulating agents. The term "water-soluble" as used herein with reference to the copolymers is meant to include copolymers which, in water, are partially water soluble and are partially in colloidal suspension as well as copolymers which are completely soluble in water. Thus, such a copolymer is formed by aqueous polymerization of the named proportion of monomers, the copolymer can be separated from the aqueous medium by addition thereto of a coagulating agent comprising a compound which produces thiocyanate ions upon dissolution in water.

It is desirable for the purposes of blending efficiency to have as high a concentration as practical of the quaternary ammonium moiety in the functional copolymer of acrylonitrile. But functional copolymers having above about 35 mole percent of quaternary monomer generally are too water-soluble to be efficiently separated from aqueous solution so that it is desirable to employ no more than this amount in the preparation of the functional copolymer of this invention.

The coagulating compound useful in this invention is added to the solution of functional copolymer in amounts sufficient to separate (i.e., precipitate or coagulate) the copolymer from solution. Preferably, excessive amounts of coagulant should not be added since the coagulants employed in the process of this invention, surprisingly, may cause the copolymer to redissolve in the aqueous medium. The copolymer is recovered from the aqueous medium, as for example, by filtration. As will be discussed hereinafter in detail, the functional copolymers of the present invention can be redissolved in solvents normally employed to form solutions of polymers of acrylonitrile and thus the copolymer can be used in blending techniques to provide dye-sites in polymers of acrylonitrile.

It is indeed surprising that the coagulants employed in the present invention do in fact, perform the desired function since many closely related compounds do not effect coagulation of the copolymer. For example, while ammonium thiocyanate and metal thiocyanate salts, as well as thiocyanic acid, are effective coagulants for the copolymers of the present invention, neither potassium cyanate nor thiourea is effective in this invention. Furthermore, that the thiocyanates function as coagulants is particularly surprising, since they are normally employed as solubilizers for polymers of acrylonitrile. The following table shows compounds which have been found not to be effective as coagulants in the practice of the present invention.

TABLE I

| | |
|---|---|
| Sodium chloride | Thiourea |
| Aluminum chloride | Acrylic acid |
| Ferric chloride | Methacrylic acid |
| Sodium sulfate | Acetic acid |
| Magnesium sulfate | Tannic acid |
| Sodium sulfite | Molybdic acid |
| Sodium bi-sulfite | Oxalic acid |
| Potassium cyanate | Trichloromethylphosphonic acid |

Quaternary ammonium monomers which can be used to form the desired functional copolymer of this invention must be characterized by ability to polymerize with acrylonitrile under aqueous conditions to give a copolymer containing relatively stable aliphatic quaternary ammonium groups. Preferred quaternary ammonium monomers are represented by the following Formula (I).

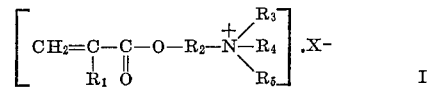

wherein $R_1$ is hydrogen or lower alkyl; $R_2$ is alkylene of 2–4 carbons, hydroxyalkylene of 2–4 carbons or oxybis-(lower alkylene) for example, the radical

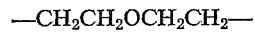

$R_3$, $R_4$ and $R_5$ are each lower alkyl having from 1 to 3 carbon atoms, and X is a water-solubilizing anion, as for example, halide (e.g., bromide), sulfate, sulfonate, phosphate, hydroxide, borate, cyanide, carbonate, nitrate, bisulfite, sulfite, methosulfate, acetate and the like. Representative quaternary ammonium compounds which can be employed to produce the functional copolymers of the present invention include those taught in U.S. Patent 3,329,706 issued July 4, 1967, such as 2-hydroxy-3-methacrylyloxy propyltrimethylammonium chloride, 2-methacrylyloxyethyltrimethylammonium methosulfate, 2 - hydroxy - 3 - methacrylyl oxypropyldiethylmethylammonium chloride, 2 - acrylyloxyethyldimethylethylammonium methosulfate, 3-acrylyloxypropyltrimethylammonium sulfate and the like.

In addition to acrylonitrile and the quaternary ammonium compound, minor quantities of other monomers normally copolymerizable with acrylonitrile can optionally be employed to produce the functional copolymers, provided such other monomers comprise not more than about 10 weight percent based upon the weight of the copolymer. Suitable comonomers which can be optionally employed include vinyl esters especially the vinyl esters of saturated aliphatic monocarboxylic acids such as vinyl acetate, vinyl propionate, vinyl butyrate and the like; acrylic and alkyacrylic acids such as methacrylic and ethacrylic acids and esters and amides of such acids such as methyl, ethyl, propyl, butyl, acrylates and methacrylates; acrylamide, methacrylamide, and methyl-, ethyl-, propyl-, butyl-, acrylamides and methacrylamides; methacrylonitrile, ethacrylonitrile and other hydrocarbon substituted acrylonitriles.

The polymerization reaction by which the functional copolymers are formed, is preferably carried out in the presence of a catalyst. The particular catalyst employed is not critical and any catalysts useful for polymerizing acrylonitrile can be employed including organic peroxy catalysts, redox catalysts, as for example as discussed in U.S. Patents 2,289,540, 2,380,474, -5, -6, -7, 2,380,617, -8, 2,380,710, 2,383,425, 2,384,544, 2,384,571, 2,384,574, 2,388,373 and 2,395,017.

The concentration of the catalyst is not critical and can be in the range of 0.001 to about 5 parts of catalyst per 100 parts of the said material. The amount of polymerization adjuvant or activator may likewise vary considerably, but generally is within the range of about 0.1 to 1 mole per mole of catalyst employed. Different ratios of catalyst and activator with respect to monomer concentration can be employed without departing from the spirit and scope of this invention.

Alternatively, polymerization can also be initiated by exposure to sources of ultraviolet radiation, high-energy particles (e.g., high-energy electrons), X-rays and gamma radiation. Cobalt–60 is a convenient source of gamma radiation.

While the particular polymerization catalyst agent employed is not critical to the process of the present invention, when employing catalytic agents such as ultraviolet light or $\alpha,\alpha'$-azodiisobutyronitrile the coagulating agent can be added during the polymerization reaction without adversely affecting the polymerization. However, when employing a redox type of catalyst, the coagulating agent should be added to the polymerization mixture after the polymerization reaction is substantially complete.

The polymerization reaction can be effected, if desired, in the presence of air or under an inert atmosphere (suitably an atmosphere of nitrogen or helium or the like). The temperature at which the polymerization is effected can be varied over a wide range up to the temperature at which boiling occurs. In most cases the polymerization temperature is maintained within the range of from about 40° C. to about 70° C., preferably at a temperature of about 50° C. to about 55° C. The use of polymerization temperatures above the boiling point of the monomer reactants in the presence of water is undesirable since these conditions generally adversely effect the color of the polymeric product.

After the functional copolymer has been prepared, it is then separated from the polymerization mixture by addition of the coagulant in accordance with this invention. The copolymers precipitated with the thiocyanate ion producing compounds are particularly useful in that they can be easily blended with polymers of acrylonitrile to improve the dyeing characteristics thereof. The copolymers precipitated with the thiocyanate ion can be dissolved in solvents normally employed to dissolve polymers of acrylonitrile and thus the blending thereof is greatly facilitated. The thiocyanate ion precipitated copolymers can be easily dissolved in concentrated aqueous thiocyanate ion solutions containing above about 25 and preferably above about 32 weight percent thiocyanate ion or in various organic solvents for polymers of acrylonitrile such as dimethylformamide, dimethylacetamide, ethylene carbonate, aqueous ethyl alcohol solution of thiocyanate ion, concentrated aqueous solutions of nitric acid, and the like.

The source of the thiocyanate ions effective as coagulants in the present invention may be any compound having sufficient solubility in aqueous medium to provide the desired concentration. Thiocyanic acid can be employed as well as various salts thereof including the sodium, potassium, ammonium and calcium salts. It is also within the scope of the present invention to employ mixtures of the thiocyanate salts as well as mixtures of the salts with the free acid. When precipitating the functional copolymer of acrylonitrile and quaternary ammonium compound with the thiocyanate ion, there is a limitation on the concentration of thiocyanate ion employed since too high a concentration will result in redissolution of the copolymer. The minimum amount of thiocyanate ion required for coagulation depends upon the concentration of the quaternary ammonium moiety in the copolymer. Within the practice of the present invention it has been found that between about 1 and about 10 percent, preferably between about 2 and about 7 percent, thiocyanate ion in the aqueous medium, based upon the weight of the water present, is sufficient to effect the desired coagulation. Further increases in the ion concentration to above about 11 weight percent gradually effects dissolution of the copolymer first to a colloidal form and then to a true solution at about a 20 to 25 weight percent concentration of ion. The concentration ranges employed depend upon the conditions of temperature and copolymer concentration in the aqueous medium. Generally higher concentrations of thiocyanate ion are required for dissolution with a decrease in temperature and an increase in the copolymer concentration.

As stated above, the functional copolymer of acrylonitrile and quaternary ammonium compound can be blended in minor amounts with polymers of acrylonitrile containing more than about 70% acrylonitrile. Polymers of acrylonitrile are well known in the art and a particularly useful method for the preparation of the same is described by Mallison, U.S. Patent 2,847,405. Within the scope of the present invention, the polymer of acrylonitrile which is blended with the functional copolymer of this invention can also contain small amounts of functional groups such as basic dye-reactive sites provided by the method of copolymerizing the acrylonitrile monomer with basic dyeable monomers, or other functional groups such as an ester group which is useful as a plasticizing group.

One aspect of the present invention is based upon the discovery of an interesting and unusual phenomenon occurring when the functional copolymer of the present invention is blended with acrylonitrile polymers containing basic-dye-reactive sites such as sulfonic acid groups introduced by sulfonic comonomers (e.g., vinyl benzene sulfonic acid, vinyl sulfonic acid, allyl sulfonic acid, vinyl benzyl sulfonic acid, substituted forms thereof and water-soluble salts thereof; many such comonomers being known to the art as useful for imparting basic dyeability to acrylonitrile polymers) or by the catalyst system (e.g. use of reducing sulfoxy compounds, such as water-soluble bisulfites, metabisulfites, sulfites, hydrosulfites in conjunction with oxidizing catalysts, such as water soluble chlorates). When the functional copolymer of the present invention is blended with such an acrylonitrile polymer, different dye properties are obtained depending upon the relative proportions thereof. When very small amounts of the functional copolymer are blended with such a basic-dye-reactive acrylonitrile polymer, the blend is less receptive to basic dyes than the acrylonitrile polymer alone but is not stained by acid dyes. When still more of the functional copolymer is added to the blend, to slightly exceed the stoichiometric proportions, the blend becomes receptive to acid dyes and is no longer even stained by basic dyes. At still higher concentrations of functional copolymer in the blend, increased acid dyeability is achieved until a maximum is achieved wherein further increases in functional copolymer concentration produce no further increases in acid dyeability.

The method for blending the polymer of acrylonitrile with the copolymer of this invention is not critical. The polymer and the copolymer can be dissolved as a blend in a common solvent or can be separately dissolved with the resultant solutions being blended, both such blending techniques being known. These solutions can be employed to make shaped articles such as films or fibers from the blended polymers. The functional copolymer and the polymer of acrylonitrile are blended in relative amounts such that the final polymer blend has the desired dye properties as indicated above.

In order to obtain fibers having commercially useful high levels of acid dyeability, the blend of functional copolymer with acrylonitrile polymer should contain at least about 20 milliequivalents per kilogram of polymer blend of quaternized nitrogen in the form of the functional copolymer in excess of the stoichiometric amount needed to inactivate any basic-dye-reactive sites (such as sulfonic acid or salt groups) which may be present. Concentrations of functional copolymer up to about 750 milliequivalents per kilogram of polymer blend of quaternized nitrogen as functional copolymer in excess of the stoichiometric amount needed to inactivate any basic-dye-reactive sites may be used although little gain in dyeability is observed above about 200 milliequivalents per kilogram excess although higher concentrations increase costs. Preferably, for full dyeability, it is preferred to use about 35 to about 150 milliequivalents per kilogram excess. Of course, if the acrylonitrile polymer is free of basic-dye-reactive sites, the above figures represent the total amounts of functional copolymer in the blend.

In order to obtain fibers having reduced levels of acid dyeability such that adequate contrast is achieved in a single dyebath between the dark shades on the fibers described above and the lighter shades on a second group of fibers, the blend of functional copolymer with acrylonitrile polymer should contain from about 5 to about 20 milliequivalents per kilogram of polymer blend of quaternized nitrogen as functional copolymer in excess of the stoichiometric amount needed to inactivate any basic-dye-reactive sites which may be present. Such fibers have reduced (relative to the fibers described in the previous paragraph) dyeability by acid dyes but are still not stained by basic dyes if present in the same dyebath. Of course, if the acrylonitrile polymer in the blend is free of basic-dye-reactive sites, the above figures represent the total amounts of functional copolymer in the blend.

To obtain fibers having commercially useful high levels of basic dyeability, it is known to incorporate acid groups (basic-dye-reactive sites) into acrylonitrile polymers (by sulfonic comonomers or appropriate redox catalyst system) such that the final polymer contains at least about 40 milliequivalents per kilogram of polymer of such acid groups. Numerous sulfonic comonomers and catalyst systems useful for this purpose are known in the prior art.

In order to obtain fibers having reduced levels of basic dyeability such that adequate contrast is achieved in a single dyebath between the dark shades on the fibers described immediately above and the lighter shades on another group of fibers, the blend of the functional copolymer with an acrylonitrile polymer containing such acid groups should be such that, after blending, there still remain about 10 to about 35 milliequivalents per kilogram of polymer blend of active basic-dye-reactive sites in excess of the ones inactivated by the functional copolymer of the present invention. Such fibers have reduced (relative to the fibers described in the previous paragraph) dyeability by basic dyes but are still not stained by acid dyes if present in the same dyebath.

In the four preceding paragraphs, four categories of fibers of acrylonitrile polymer were described, each of which possessed different dye properties yet all could be made merely by blending different relative proportions of the same two constituents: (a) an acrylonitrile polymer containing basic-dye-reactive sites and (b) the functional copolymer of the present invention. When two or more of such types of fibers are placed in a single dyebath, many interesting and unusual dyeings are possible giving unusually clear and crisp colors since the fibers dyeable by the acid dyes are not stained by the basic dyes and the fibers dyeable by the basic dyes are not stained by the acid dyes even though both acid dyes and basic dyes may be present concurrently in the same dyebath and conventional dyeing techniques are utilized.

Additional novel dye effects can be produced by forming bicomponent fibers whose two components are formed of polymer blends, as above described, having different dye characteristics. For example, one component could have about 50 milliequivalents per kilogram of polymer of active basic-dye-reactive sites and the other component could have about 50 milliequivalents per kilogram of polymer blend of quaternized nitrogen as functional copolymer in excess of that needed to inactive any basic-dye reactive sites which might be present. With such fibers, when dyed in a single dyebath containing both acid and basic dyes, the components will separately dye with the separate dyes without cross-staining.

It is surprising that copolymers produced from aromatic quaternary ammonium monomers are not equally suitable for blending with polymers of acrylonitrile for forming shaped articles such as by spinning into synthetic fibers. For example, it has been found that certain aromatic quaternary copolymers exhibit undesirable colors, are not compatible with the polymers of acrylonitrile neither in solution nor in the fiber and exhibit very poor light stability as compared to the functional copolymers of this invention. The term "compatible" refers to the condition of a spinning solution or "dope" and to fibers spun from the dope. For instance, a dope containing a single polymer is "compatible" if it may be spun without difficulty into a microscopically homogeneous fiber. When two or more polymer solutions are mixed together into a spin dope to form one homogeneous phase having a uniform viscosity and refractive index, they are said to be compatible. Similarly, microscopically homogeneous fibers having uniform cross-section and denier are said to be comprised of "compatible" polymers. Conversely, when upon mixing two solutions together, there is phase separation, either visually or microscopically, an incompatibility of the polymers is said to exist which would interfere with proper fiber production. Obviously, such incompatible solutions are not adaptable for large-scale spinning operations.

Reference is made to the following table which illustrates these characteristic differences. All of the fibers listed were prepared from a blend of (a) about 92 weight percent polymer of acrylonitrile and (b) about 8 weight percent of a copolymer of 50 weight percent of the listed quaternary and 50 weight percent acrylonitrile.

TABLE II

| Quaternary | Degree of compatibility in conc. aqueous sodium thiocyanate solvent | Color | Stability to U.V. light |
|---|---|---|---|
| 4-vinyl-N-methyl pyridinium methosulfate. | Moderately incompatible. | Yellow-green. | Poor. |
| 2-methyl-5-vinyl-N-methyl pyridinium methosulfate. | Very incompatible. | Yellow | Do. |
| 2-hydroxy-3-methacrylyloxy-propyltrimethylammonium chloride. | Compatible | White | Very good. |
| 2-methylacrylyloxyethyl-trimethylammonium methosulfate. | do | do | Do. |

These differences will be more clearly and specifically described in the examples which follow.

The following examples are intended to illustrate the process of the present invention and are not intended to limit the same.

EXAMPLE 1

Preparation of 82/18 mole percent copolymer of acrylonitrile/2-hydroxy - 3 - methacrylyloxypropyltrimethylammonium chloride 732 parts (13.8 moles) of acrylonitrile, 732 parts (3.1 moles) of 2-hydroxy-3-methacrylyloxypropyltrimethylammonium chloride, and 6200 parts of water were charged into a vessel fitted with a stirrer, reflux condenser, and thermocouple. The solution was acidified with 20 parts of 70% nitric acid and the temperature raised to 45° C. To the stirred solution was added a mixture of sodium chlorate (3.9 parts) and sodium sulfite (27.7 parts) dissolved in 1,500 parts of water. This catalyst solution was added continuously over a period of 60 minutes while maintaining the temperatures between 50 to 60° C. with external cooling. After stirring for an additional 30 minutes after completion of the catalyst addition, the reaction mixture was cooled to 30° C. and discharged from the reactor.

The reaction product, in the form of an aqueous emulsion, could not be precipitated by addition of the salts listed in Table I.

To the reaction product an aqueous solution was added 600 parts of 50% aqueous sodium thiocyanate and the mixture was stirred for 10 minutes, then discharged to a centrifuge, and the precipitate wased with 30,000 parts of 1% aqueous sodium thiocyanate. The dried polymer was extracted with isopropanol to remove traces of sodium thiocyanate. 1,442 parts of product (98.5% yield) were obtained which showed the following sulfur analysis: Sulfur Content (calculated): 6.35%. (found): 6.24%.

This example shows the preparation of a functional copolmer of the present invention and its precipitation as the thiocyanate salt.

EXAMPLE 2

Preparation of aqueous solution of thiocyanate salt of copolymer

To 200 parts of the functional copolymer of Example 1 in dried form was added 800 parts of 50% aqueous sodium thiocyanate solution and the resultant mixture was stirred for 30 minutes at ambient conditions (25° C.). A clear solution of the following composition resulted.

| | Weight percent |
|---|---|
| Copolymer | 20 |
| Sodium thiocyanate | 40 |
| Water | 40 |

This example shows that the thiocyanate salts of the functional copolymers of the present invention are soluble in concentrated solutions of thiocyanate ions. The functional copolymer was also soluble in organic solvents such as dimethyl formamide, dimethyl sulfoxide and dimethyl acetamide.

EXAMPLE 3

Preparation of 91/9 mole percent copolymer of acrylonitrile/2 - hydroxy - 3-methacrylyloxypropyltrimethylammonium chloride Following the procedure of Example 1 but employing 1,022 parts (19.2 moles) of acrylonitrile and 438 parts (1.84 moles) of 2-hydroxy-3-methacrylyloxypropyltrimethylammonium chloride, there was obtained 1,440 parts (98.7% yield) of the thiocyanate salt of the copolymer having the following sulfur analysis: Sulfur Content (calculated): 3.94% (found): 3.72%.

EXAMPLE 4

Preparation of 95/5 mole percent copolymer of acrylonitrile/2 - hydroxy - 3-methacrylyloxypropyltrimethylammonium chloride Following the procedure of Example 1 but employing 1,197 parts (22.6 moles) of acrylonitrile and 263 parts (1.1 moles) of 2-hydroxy-3-methacrylyloxypropyltrimethylammonium chloride, there was obtained a copolymer of 95.3/4.7 mole percent composition of the respective monomers which precipitated from the reaction medium.

This example shows that low concentrations of 2-hydroxy-3-methacrylyloxypropyltrimethylammonium chloride of the copolymer result in water insoluble copolymers.

EXAMPLE 5

Preparation of 63/37 mole percent copolymer of acrylonitrile/2 - hydroxy - 3-methacrylyloxypropyltrimethylammonium chloride Following the procedure of Example 1 but employing 409 parts (7.7 moles) of acrylonitrile and 1,051 parts (4.4 moles) of 2-hydroxy-3-methacrylyloxypropyltrimethylammonium chloride, there was obtained a copolymer of 63/37 mole percent composition of the respective monomers which was soluble in the aqueous reaction medium, but could not be separated as a filterable solid by addition thereto of thiocyanate ions.

This example shows that too high concentrations of 2-hydroxy - 3 - methacrylyloxypropyltrimethylammonium chloride in the copolymer result in water soluble copolymers which are too soluble to be precipitated and are thus not suitable for use in the present invention.

EXAMPLE 6

Preparation of 82/18 mole percent copolymer of acrylonitrile/2 - hydroxy - 3-methacrylyloxypropyltrimethylammonium chloride 732 parts (13.8 moles) of acrylonitrile, 732 parts (3.1 moles) of 2-hydroxy-3-methacrylyloxpyropyltrimethylammonium chloride, and 7,300 parts of water containing 30 parts of azo-bis-isobutyronitrile was stirred in a suitable reactor for 2.5 hours at 70° C. The emulsion which was obtained was cooled to 30° C. and treated with 500 parts of 50% aqueous sodium thiocyanate. The precipitate which formed was filtered, washed with 1% aqueous sodium thiocyanate, and dried.

EXAMPLE 7

Preparation of 84/16 mole percent copolymer of acrylonitrile/2-methacrylyloxyethyltrimethylammonium methosulfate 52.6 parts (1 mole) of acrylonitrile, 52.6 parts (.186 mole) of 2 - methacrylyloxyethyltrimethylammonium methosulfate, 2.1 parts of azo-bis-isobutyronitrile and 525 parts of water in a suitable reactor were heated for two hours at 70° C. The aqueous dispersion which resulted was treated with sufficient sodium thiocyanate to have it contain 5% of this ingredient by weight. The precipitate which resulted was washed with a 3% aqueous solution of sodium thiocylanate as it was filtered.

EXAMPLE 8

Preparation of 81/19 mole percent copolymer of acrylonitrile/acrylyloxymethyltriethylammonium chloride Following the procedure of Example 1 but except for the use of 732 parts (13.8 moles) acrylonitrile and 732 parts (3.3 moles) acrylyloxymethyltriethylammonium chloride, a precipitable copolymer was prepared (95% yield).

The reaction product was in the form of an aqueous dispersion which was readily precipitated by use of sodium thiocyanate and potassium thiocyanate.

EXAMPLE 9

A spinning dope was prepared by dissolving 11.5 parts of a polymer of acrylonitrile having copolymerized therewith 10% methyl methacrylate into 88.5 parts of a 40% aqueous sodium thiocyanate solution. The spinning dope was optically clear and completely homogeneous. The spinning followed standard wet spinning procedures using a coagulating bath of 10% aqueous sodium thiocyanate at 0° C. The resulting fibers were examined microscopically in cross-section and longitudinally for structure flaws, inclusions or other indications of "non-compatibility." In addition, the fiber was very bright and lustrous. All tests and measurements indicated a homogeneous fiber and it was used as a standard for comparison with other fibers.

Since the polymer of this example was produced using a chlorate/sulfite polymerization catalyst system, the polymer molecules were each provided with sulfonic acid end groups which provided basic-dye-reactive sites. This polymer contained 50 milliequivalents of sulfonic acid groups per kilogram of polymer. These fibers could be dyed to deep shades with basic dyes. However, these fibers could not be dyed with acid dyes since the polymer did not provide any acid-dye-reactive sites.

EXAMPLE 10

50 grams of the copolymer solution of Example 2 were added to 1,000 grams of the polymer solution of Example 9 to form a blended solution containing 11.9 weight percent total polymer. There was no cloudiness or phase separation to indicate any incompatibility of the polymer solutions with each other.

Fibers were obtained by extruding the blended solution into a dilute aqueous thiocyanate solution at 0° C. washing the formed aqua gel free of solvent, then stretching in water at 100° C. and thereafter drying and relaxing the fibers in a humid atmosphere at temperatures up to 127° C. The fibers obtained were lustrous and white. When examined by cross-section microscopy, there was no indication of inclusions or other flaws to suggest incompatibility of the polymers. This polymer blend contained about 120 milliequivalents per kilogram of polymer blend of quaternized nitrogen as the functional copolymer of the present invention in excess of that required to inactivate all the sulfonic acid end groups present. Although the fiber was readily dyeable with acid dyes to deep shades, it would not stain when exposed to basic dyes, thus indicating that the end groups of sulfonic acid had been blocked by salt formation with quaternary ammonium groups.

EXAMPLE 11

A solution was prepared as in Example 2 but using a functional copolymer prepared from 732 parts (13.8 moles) of acrylonitrile and 732 parts (3 moles) of 2 - methyl - 5 - vinyl - N - methylpyridinium methosulfate in 6200 parts of water by the process of Example 1. A cloudy solution containing gels was obtained. A sufficient quantity of this solution was added to the solution of Example 9 to obtain a blended spinning dope in which the quaternary ammonium polymer comprised 3.5 weight percent of the total polymer content. The blended dope was cloudy and contained gels. Fibers were spun as in Example 10. Cross-sectional microscopic examination of these fibers indicated a profusion of discrete inclusions within the matrix of the fiber and showed a general incompatibility of the polymer blend in the fiber. The color of the fiber was slightly yellower than that of the fiber of Example 10.

EXAMPLE 12

The procedure of Example 11 was followed to prepare a functional copolymer from 732 parts (13.8 moles) of acrylonitrile and 732 parts (3.2 moles) of 4-vinyl-N-methylpyridinium methosulfate in 6000 parts of water. The solution of the functional copolymer was clear and without gels. Blending of the solution with the solution of Example 9, however, provided a slightly cloudy mix. Fibers spun from this dope were found to be of marginal homogenity and they were very yellow, and upon heating, turned green.

EXAMPLE 13

To further illustrate the uniqueness of the aliphatic quaternary copolymers in the practice of this invention, fibers prepared by Examples 10, 11 and 12 were acid dyed in a bath containing 1% Calcocid Alizarin Blue AR at 95° C. for one hour. The dyeing was performed competitively with all samples being dyed along with a standard. The standard used was a fiber prepared from a terpolymer of acrylonitrile, vinyl acetate and methyl vinyl pyridine. After dyeing, each fiber was exposed to a carbon arc fadeometer to determine the stability of the dyed fibers to ultraviolet light. The following table lists the results.

| Fiber | Type quaternary | Dye-ability | Hours stable to U.V. |
|---|---|---|---|
| Standard | None | 100 | 80 |
| Example 10 | Aliphatic | 100 | 80 |
| Example 11 | Aromatic | 75 | 20 |
| Example 12 | do | 30 | 20 |

It will be noted from the data that the fibers of Examples 11 and 12 containing aromatic quaternary ammonium moieties do not dye as well as the fiber of Example 10 or the standard fiber containing methyl vinyl pyridine. Most surprisingly, however, is the very poor stability of the aromatic quaternary to ultraviolet light.

EXAMPLE 14

In the manner of Example 10, several blended spinning solutions were prepared by adding various quantities of the copolymer solution of Example 2 to separate samples of the polymer solution of Example 9. These samples were then spun to form fibers as in Example 10, and the fibers formed into separate yarns. The separate yarns, when dyed together (e.g. as a fabric) in a dyebath containing a mixture of Calcocid Alizarine Blue AR, an acid dye and Calcozine Acrylic Red B, a basic dye and maintained at a pH of 4.0 by acetic acid produced the following results.

| Fiber No. | Meq./Kg. blend [1] | Dyeability Level |
|---|---|---|
| 1 | 50 SO$_3$H– | 100% basic dye (no acid dye stain). |
| 2 | 17 SO$_3$H–⅓ | 40% basic dye (no acid dye stain). |
| 3 | 75 —N— ⅓ | 90% acid dye (no basic dye stain). |

[1] Milliequivalents per kilogram of polymer blend of the sulfonic acid group or quaternary ammonium moiety in excess of such groups as have inactivated each other.

I claim:

1. A copoylmer of about 65 to 92 mole percent acrylonitrile and about 8 to 35 mole percent of a salt of the formula:

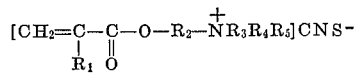

wherein $R_1$ is selected from the group consisting of hydrogen and methyl, $R_2$ is selected from the group consisting of alkylene and hydroxyalkylene of two to four carbon atoms and —$CH_2CH_2OCH_2CH_2$—, and $R_3$, $R_4$ and $R_5$ are each lower alkyl of between 1 and 3 carbon atoms.

2. A copolymer as defined in claim 1 wherein said salt is selected from the group consisting of:

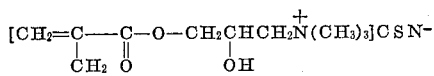

and

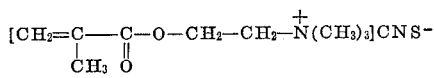

3. A solution of the copolymer of claim 1 in a solvent selected from concentrated aqueous thiocyanate salt solutions and organic solvents for polymers of acrylonitrile.

4. A solution as defined in claim 3 including, in addition, a polymer of acrylonitrile having at least 70 weight percent acrylonitrile.

5. A shaped article comprising a blend of the copolymer of claim 1 and a polymer of acrylonitrile having at least 70 weight percent acrylonitrile.

6. A shaped article as defined in claim 5 wherein said copolymer is a copolymer of acrylonitrile and the thiocyanate salt of

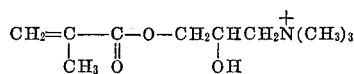

or

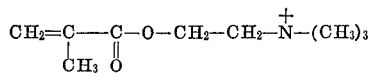

7. A shaped article as defined in claim 5 wherein said acrylonitrile polymer contains at least 50 milliequivalents per kilogram of acrylonitrile polymer of basic-dye-reactive sites.

8. A shaped article as defined in claim 7 wherein, said copolymer is present in said blend in a quantity sufficient to inactivate all except 10 to 35 milliequivalents per kilogram of polymer blend of said basic-dye-reactive sites of said acrylonitrile polymer.

9. A shaped article as defined in claim 7 wherein said copolymer is present in said blend in a quantity sufficient to inactivate all said basic-dye-reactive sites of acrylonitrile polymer and to provide 5 to 20 milliequivalents per kilogram of polymer blend of acid-dye-reactive sites.

10. A shaped article as defined in claim 7 wherein said copolymer is present in said blend in a quantity sufficient to inactivate all said basic-dye-reactive sites of said acrylonitrile polymer and to provide 20 to 750 milliequivalents per kilogram of polymer blend of acid-dye-reactive sites.

11. A shaped article as defined in claim 7 wherein said copolymer is present in said blend in a quantity sufficient to inactivate all said basic-dye-reactive sites of said acrylonitrile polymer and to provide 35 to 150 milliequivalents per kilogram of polymer blend of acid-dye-reactive sites.

12. Yarns or fabrics comprising a plurality of fibers selected from at least two of the groups (a) acrylonitrile polymers containing at least 50 milliequivalents per kilogram of polymer of basic-dye-reactive sites; (b) blend of said acrylonitrile polymers with sufficient of the copolymer of claim 1 to inactivate all except 10 to 35 milliequivalents per kilogram of polymer blend of said basic-dye-reactive sites; (c) blends of said acrylonitrile polymers with sufficient of the copolymer of claim 1 to inactivate all said basic-dye-reactive sites and to provide 5 to 20 milliequivalents per kilogram of polymer blend of acid-dye-reactive sites; and (d) blends of said acrylonitrile polymers with sufficient of the copolymer of claim 1 to inactivate all said basic-dye-reactive sites and to provide 20 to 750 milliequivalents per kilogram of polymer blend of acid-dye-reactive sites.

13. A process for preparing copolymers comprising copolymerizing, in an aqueous medium, a mixture of monomers containing about 65 to 92 mole percent acrylonitrile and about 8 to 35 mole percent of a salt of

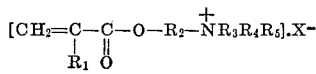

wherein $R_1$ is hydrogen or methyl, $R_2$ is alkylene or hydroxyalkylene of two to four carbon atoms or $$-CH_2CH_2OCH_2CH_2$$

$R_3$, $R_4$ and $R_5$ are each lower alkyl of between 1 and 3 carbon atoms, and X is a water-soluble anion, and precipitating the resulting copolymer from said aqueous medium by means of an effective amount of a precipitating compound comprising a water-soluble thiocyanate compound.

14. A process as defined in claim 13 wherein said copolymerizing step is conducted in an aqueous medium containing an effective concentration of said precipitating compound.

15. A process as defined in claim 13 wherein said precipitating compound is added to said aqueous medium after completion of said copolymerizing step.

16. A process for preparing fibers comprising: (a) copolymerizing, in an aqueous medium, a mixture of monomers containing about 65 to 92 mole percent acrylonitrile and about 8 to 35 mole percent of a water-soluble salt of

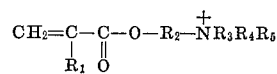

wherein $R_1$ is hydrogen or methyl, $R_2$ is alkylene or hydroxy-alkylene of two to four carbon atoms or $$-CH_2CH_2OCH_2CH_2-$$

and $R_3$, $R_4$ and $R_5$ are each lower alkyl having from 1 to 3 carbon atoms; (b) precipitating the resulting copolymer from said aqueous medium by means of an effective amount of a water-soluble thiocyanate compound; (c) forming a solution of (1) the thus precipitated thiocyanate salt of said copolymer with (2) a polymer of acrylonitrile having at least 70 weight percent acrylonitrile in a solvent; and (d) spinning said solution to form fibers therefrom.

17. A process as defined in claim 16 wherein said solvent is a concentrated aqueous solution of a thiocyanate salt.

References Cited
UNITED STATES PATENTS

| | | | |
|---|---|---|---|
| 2,688,008 | 8/1954 | Chaney et al. | 260—898 |
| 2,794,015 | 5/1957 | Jackson et al. | 260—85.5 |
| Re. 24,164 | 6/1956 | Barney | 260—85.5 |
| 2,810,713 | 10/1957 | Melamed | 260—85.5 |
| 2,941,969 | 6/1960 | Price | 260—29.6 |

FOREIGN PATENTS

| | | | |
|---|---|---|---|
| 865,814 | 4/1961 | Great Britain | 260—85.5 |

MURRAY TILLMAN, Primary Examiner

H. ROBERTS, Assistant Examiner

U.S. Cl. X.R.

8—15, 55; 260—32.6, 33.4, 79.5, 85.5, 898; 264—78, 182, 206

UNITED STATES PATENT OFFICE
CERTIFICATE OF CORRECTION

Patent No. 3,574,158    Dated April 6, 1971

Inventor(s) Denis Coleman

It is certified that error appears in the above-identified patent and that said Letters Patent are hereby corrected as shown below:

Column 3, line 53, before "such", insert -- if --. Column 8, line 15, "inactive" should read -- inactivate --. Column 9, li 21, "wased" should read -- washed --. Column 10, line 49, "thi cylanate" should read -- thiocyanate --. Column 12, line 38, $$\begin{matrix} 1/8 \\ -N- \\ 1/8 \end{matrix} \quad \text{should read} \quad \begin{matrix} | \\ -N- \\ | \end{matrix}$$

Column 12, lines 59 & 60, the left portion of the formula read:

$$[CH_2=C- \atop | \atop CH_2] \quad \text{should read} \quad [CH_2=C- \atop | \atop CH_3]$$

and the right portion of the formula reading "]CSN-" should re: -- ]CNS⁻ --. Column 14 line 3, the right portion of the formu: reading "CH₂" should read -- CH₂- --.

Signed and sealed this 26th day of October 1971.

(SEAL)
Attest:

EDWARD M. FLETCHER, JR.
Attesting Officer

ROBERT GOTTSCHALK
Acting Commissioner of Pat